Inventor
Hubert D. Rodgers
Murray & Zugelter
Attorneys.

Feb. 19, 1935.　　　H. D. RODGERS　　　1,992,040
AUTOMATIC HYDRAULIC TRANSMISSION
Filed Feb. 24, 1934　　2 Sheets-Sheet 2
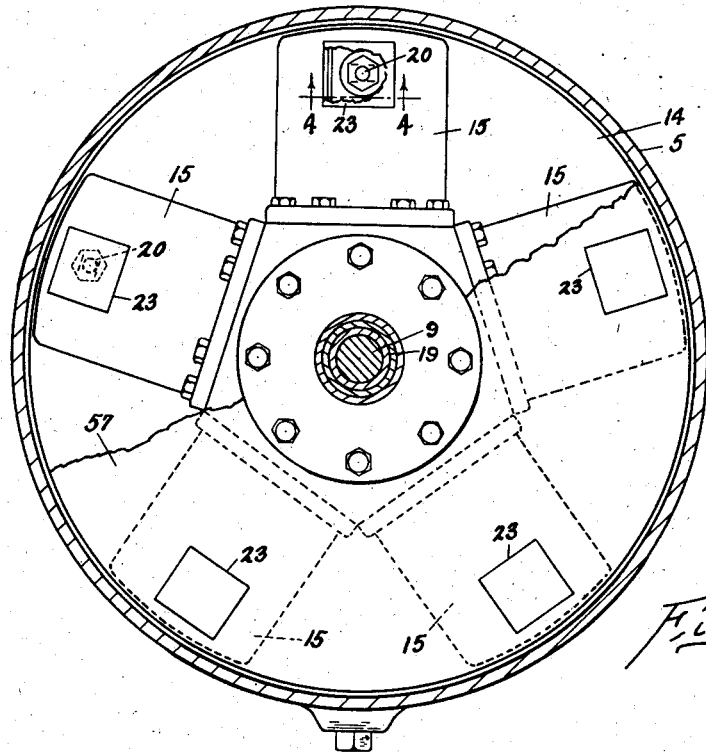
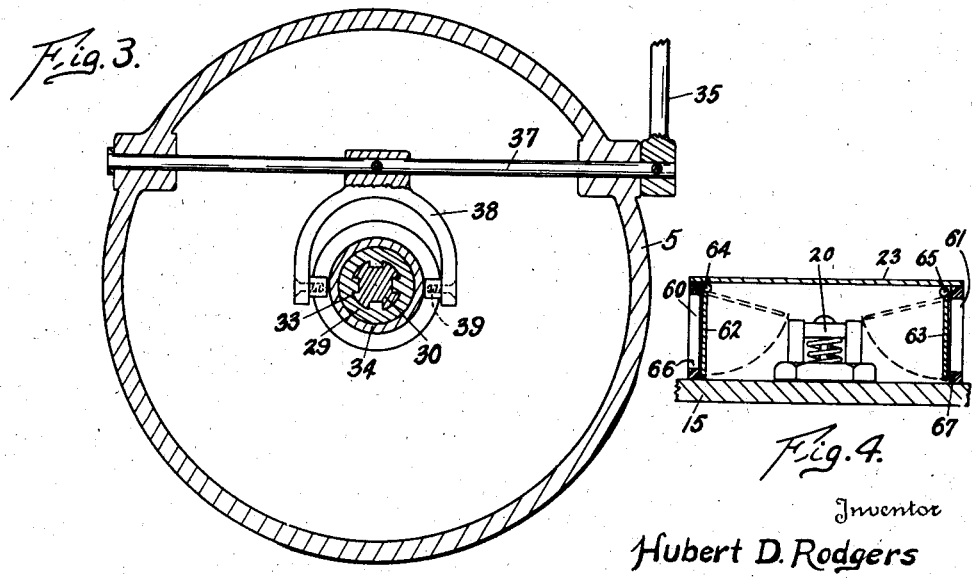
Inventor
Hubert D. Rodgers
By Murray and Zugelter
Attorneys Patented Feb. 19, 1935

1,992,040

UNITED STATES PATENT OFFICE 1,992,040

AUTOMATIC HYDRAULIC TRANSMISSION

Hubert D. Rodgers, Merrill, Oreg.

Application February 24, 1934, Serial No. 712,764

6 Claims. (Cl. 192—60)

This invention relates to an automatic hydraulic transmission device for varying the rate of rotation of a driven shaft relative to a drive shaft, according as the load on the driven shaft is increased or decreased. The device will be described with respect to its association with the motor shaft and the propeller shaft of a vehicle, although it is to be distinctly understood that the device has application in various other arts, such as the driving of shop machinery, pumps, mills, boats, and the like, or any place where a change in shaft rotation ratio is necessary or desirable for increasing the power output of a driven shaft at slower speeds.

An object of the invention is to provide a device of the character referred to, which will change the ratio of shaft speeds automatically upon the application of various loads to the driven shaft.

Another object is to provide means in association with a device of this kind, whereby the device may be adjusted while in operation, if desired, to operate automatically at various predetermined load magnitudes, so that under different conditions a light load or a heavy load may bring about an automatic change in shaft speed and power ratio.

Another object of the invention is to provide a device of the above stated character with a simple, effective, and easily operated means for adjusting the load-responsive mechanism to effect an automatic speed change upon the application of different loads to the driven shaft.

The foregoing and other objects are attained by the means described herein and disclosed in the accompanying drawings, in which:

Fig. 2 is a cross-sectional view taken on line 2—2 of Fig. 1.

Fig. 3 is a cross-sectional view taken on line 3—3 of Fig. 1.

Fig. 4 is a sectional view taken on line 4—4 of Fig. 2.

Figure 1:
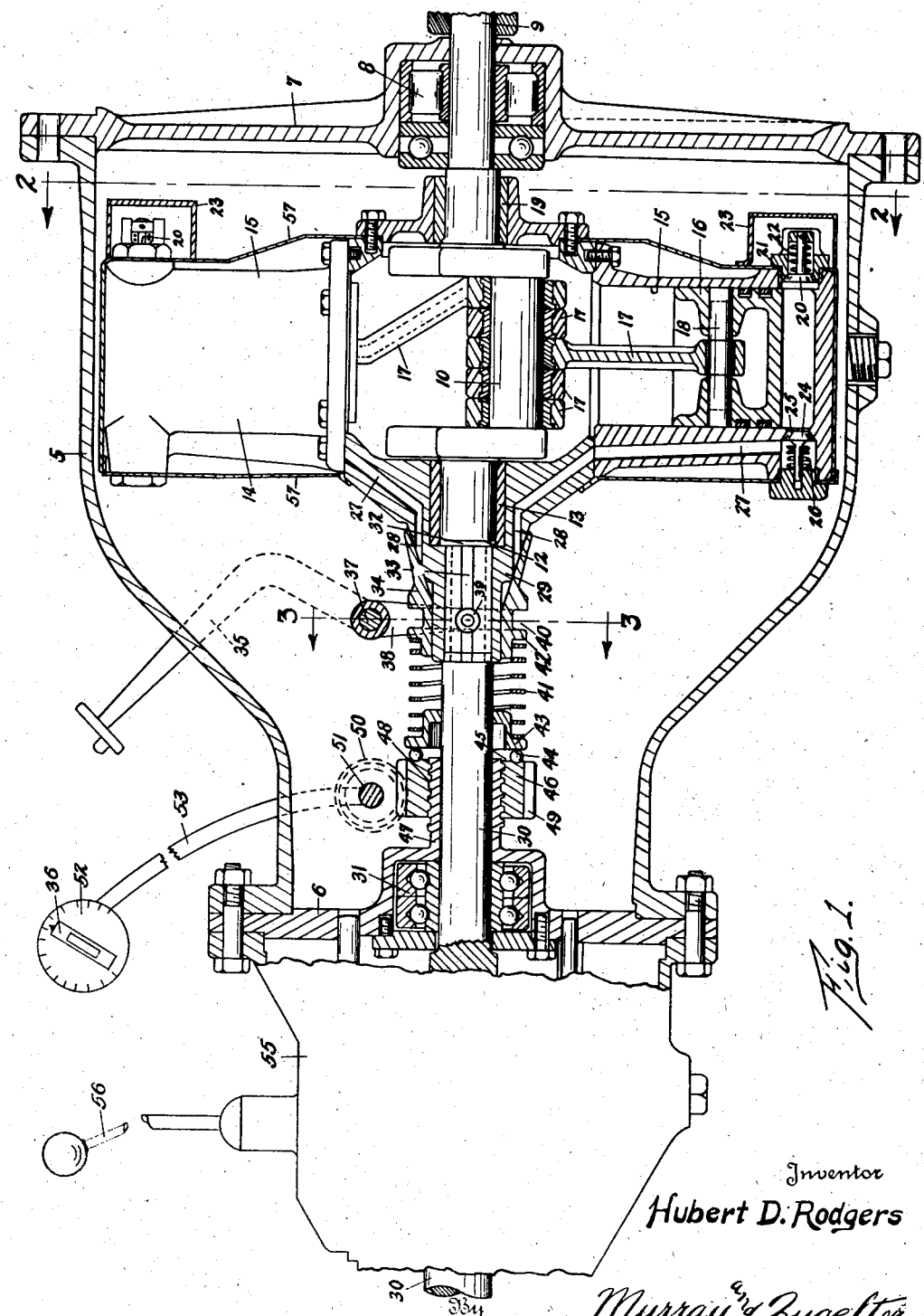
Fig. 1 is a longitudinal cross-sectional view of the automatic hydraulic transmission of the invention, certain conventional elements being shown in elevation.

The device of this invention comprises a fluid tight housing or hollow casing 5 having end walls 6 and 7, said housing or casing being adapted to contain a quantity of lubricating oil or other liquid which is not materially affected by changes in temperature. The end wall 7 supports a suitable bearing means 8 in which is rotatably received the drive shaft 9. The shaft 9 may be positively driven by a motor of any kind. The shaft 9 includes a crank or eccentric element 10, and has a dead end 12 supported in a bushing 13 carried by the large rotatable wheel or drum 14. The element 14 will be referred to as a cylinder wheel or drum, as it carries a series of radially disposed cylinders indicated by the character 15. Each of the cylinders is provided with a conventional reciprocating piston 16 that has connection with the crank or eccentric element 10 by means of a connecting rod 17 and the usual wrist pin structure 18. As indicated in the drawings, the device includes a series of five cylinders, pistons, and connecting rods, but it is to be understood that any suitable number of pistons and associated parts may be employed.

The cylinder wheel or drum 14 is rotatably mounted upon the drive shaft 9 as indicated at 19, so that rotation of the drive shaft does not necessarily result in rotation of the cylinder wheel.

Each cylinder includes an automatic intake valve 20 which is yieldingly maintained upon its stationary seat 21 by a suitable spring means 22, and said spring means is of a proper force to permit intake of fluid into the cylinder as the wheel or drum 14 moves through the fluid. The fluid is forced toward the yieldingly closed valves by means of a series of scoops 23 which are stationarily mounted upon the wheel or drum. Suction created by the pistons may also assist in opening the intake valves 20.

Each cylinder is provided also with an exhaust valve 24 which is yieldingly maintained upon its stationary seat 25 by means of a spring or the like 26. The spring 26 is of a proper force to permit automatic exhaust of fluid from the cylinder when the piston advances toward the valves. The fluid so exhausted passes along the exhaust passages or bores 27, each of which passages terminates in an opening or exhaust port 28 formed in the tapered or cone-shaped hub 29 of wheel or drum 14. It is to be understood that each of the several cylinders is provided with an exhaust arrangement and an intake arrangement such as is above described, and that each exhaust passage terminates in a port similar to that indicated at 28 in Fig. 1. Attention is now directed to the driven shaft 30 and its manner of association with the structure just described. The driven shaft 30 is suitably mounted for rotation in suitable bearing means 31 supported by the rear wall 6. The innermost end 32 of the driven shaft is splined into the hub 29 of the cylinder wheel or drum as shown at 33. Thus, the driven shaft 30 always rotates with the cylinder wheel or drum, but not necessarily with the drive shaft 9.

The device includes a normally closed pressure operated valve having associated therewith a manually operable means 35 for disposition of the valve member to the full open position, and also a manual means 36 of any suitable design, for adjusting the closing force of the valve member 34 against the ports 28. The manually operable means 35 for moving the valve to the full open position may comprise the lever indicated, which is pivotally mounted as at 37 upon the housing or casing 5, said member including a fork or yoke 38 which has a suitable pin or roller 39 adapted to ride within the annular groove or way 40 of the valve member 34. From the foregoing it should be understood by depressing the lever 35 and moving it clockwise about the pivot 37, the valve member 34 will be moved rearwardly against the force of spring 41, to substantially uncover the exhaust ports 28 and permit the free exhaust of liquid from the cylinders by way of the passages 27. When the valve 34—29 is so opened, it is possible for the fluid within the various cylinders to discharge as fast as the cylinders are filled up, so that rotation of the drive shaft and crank 10 will not be transmitted to the cylinder wheel or drum 14. On the other hand, when the valve 29—34 is maintained in the closed position, escape of fluid through the passages 27 is rendered impossible, with the result that the entire structure including the cylinder wheel or drum 14 must rotate with the drive shaft 9. From this it will be evident that a slight or partial opening of the valve 34—29 will result in movement of the cylinder wheel and driven shaft 30 at a rate of rotation slower than that of the drive shaft 9, the rate of rotation of 14 and 30 being dependent upon the degree of opening permitted by the valve member 34.

The spring 41 constitutes the yielding means for maintaining the valve element 34 in closing relationship with the exhaust ports 28. Said spring has one of its ends abutting the abutment 42 of the valve element 34, while its opposite end abuts a bearing race 43 which encircles the driven shaft 30. The bearing race preferably has a suitable frictionless bearing 44 upon the end face 45 of a longitudinally adjustable member 46. Any suitable means may be provided for adjusting the member 46 longitudinally of the driven shaft 30 for the purpose of increasing and decreasing the force which spring 41 imposes upon the valve member 34. A description of a preferred form of means for so adjusting the member 46 follows.

It will be observed that the rear wall 6 of the housing includes a stationary hollow sleeve or threaded member 47 which encircles a driven shaft. The threaded member 47 may be either integral with the rear wall 6 or suitably fixed relative thereto if made as a separate part. The threads on member 47 are indicated at 48. The rotatable internally threaded nut member 46 may be in the form of a pinion or worm wheel having outer peripheral teeth 49 adapted to be engaged by a worm or other cooperative gear member 50. The worm 50 is mounted upon a rotatable shaft 51 which extends through the housing and has suitable rotatory connection with the hand lever or key 36, which latter preferably is mounted upon the dash board or other convenient part of a vehicle. The structure indicated at 36 may include a calibrated or indexed dial 52 whereby the operator may be informed as to the pressure at which the valve 34 will unseat when the driven shaft 30 is under load. The character 53 indicates any suitable type of flexible coupling means or cable whereby rotational movement of the hand piece 36 will be transmitted to the worm 50.

From the foregoing it should clearly be understood that rotational movement of the worm 50 will result in rotation of the pinion 46, and the pinion 46, due to this threaded relationship with the stationary member 47, will thus be adjusted longitudinally of member 47 toward and from the valve member 34. By the means just described, the operator may predetermine the force which the spring 41 will impose upon the valve member 34 to maintain it yieldingly in closed position with respect to the exhaust ports 28. If the operator so desires, he may adjust the force of spring 41 so that the valve member 34 will automatically be unseated when sufficient resistance is applied to the driven shaft 30 to build up a high pressure within the several cylinders. The device, therefore, is rendered automatic to reduce the speed of the driven shaft 30 without reducing the speed of the drive shaft, when an excessive load is applied to the driven shaft.

It is to be observed that the elements 29 and 34 are tapered to provide complementary cone parts whereby a slow progressive opening or closing of the ports 28 may be effected by means of the manually operated parts 36—53—50 or by the automatic action which takes place upon application of a load to the driven shaft 30. The throw of the valve release means 35—38 may be sufficient to completely relieve any pressure built up at the ports 28 by reason of the operation of the pistons, so that the drive shaft 9 may rotate while the driven shaft 30 remains in a state of rest. The device is capable of operation with a minimum of effort on the part of the operator.

The character 55 indicates a gear box which may include a reversing mechanism of any approved construction, and the reversing mechanism may be actuated by means of a suitable lever 56 located for convenient actuation by the operator. The shielding plates 57 are applied to the rotating wheel or drum 14 for the purpose of precluding "oil beating", or the resistance that would result from rotating a rough wheel or drum through the liquid.

When descending a hill or grade, a vehicle provided with the device disclosed herein may have its speed retarded by throwing the reversing device 55 into operation, in which case the entry and discharge of fluid relative to the cylinders exerts a braking action between the shaft 30 and shaft 9. In order to insure an adequate supply of fluid to the cylinders when the cylinder wheel is thus rotated in a reversed direction, the several scoops or hoods 23 may be of the automatic two-way type disclosed in detail in Fig. 4. As shown, the scoop body 23 has both of its ends open as indicated at 60 and 61, the open ends being provided with hinged doors or plates 62 and 63, respectively. The doors are adapted for movement about their respective hinges 64 and 65 to the broken line positions indicated, door 63 being opened and door 62 being closed by the fluid pressure when the cylinder wheel is rotated in a clockwise direction of rotation, as viewed from Fig. 2. Rotation of the cylinder wheel in a counter-clockwise direction will of course result in opening of the door 62 and closing of door 63. Thus, the doors serve to direct fluid toward the intake valves regardless of the direction of rotation of the cylinder wheel. Outward movement of the doors is limited by the inner frames 66 and 67 against which the doors may abut, as is evident. Two-way fluid directing structures other than the particular one disclosed in Fig. 4 may be employed, if desired.

It is to be understood that various modifications and changes in the structural details of the device may be made, within the scope of the appended claims, without departing from the spirit of the invention.

What is claimed is:

1. In a power transmission device, the combination of a housing for containing a predetermined level of liquid, a drive shaft rotatably supported at one end of the housing, a driven shaft rotatably supported at the opposite end of the housing, the two shafts being in axial alignment, a substantially hollow cylinder wheel mounted for rotation upon but relative to the drive shaft, a valve hub carried by the cylinder wheel, an eccentric element on the drive shaft and disposed within the cylinder wheel, a plurality of cylinders disposed radially of the cylinder wheel, a reciprocable piston in each cylinder, and a connecting rod for each piston to connect the pistons with the eccentric element of the drive shaft so that relative rotational movement between the eccentric element and the cylinder wheel results in reciprocatory movement of the pistons within the cylinders, self-closing yieldable valve means near the periphery of the cylinder wheel for directing liquid contained by the housing into each of the cylinders when the valve means are submerged in the liquid, an exhaust valve and an associated exhaust passage for each cylinder, said exhaust passages terminating in liquid exhaust ports in the valve hub of the cylinder wheel, a yielding valve element normally closing the said exhaust ports of the hub, and means for regulating the force with which the yielding valve element impinges upon the hub to close the exhaust ports.

2. In a power transmission device, the combination of a housing for containing a predetermined level of liquid, a drive shaft rotatably supported at one end of the housing, a driven shaft rotatably supported at the opposite end of the housing, the two shafts being in axial alignment, a substantially hollow cylinder wheel mounted for rotation upon but relative to the drive shaft, a valve hub carried by the cylinder wheel, an eccentric element on the drive shaft and disposed within the cylinder wheel, a plurality of cylinders disposed radially of the cylinder wheel, a reciprocable piston in each cylinder, and a connecting rod for each piston to connect the pistons with the eccentric element of the drive shaft so that relative rotational movement between the eccentric element and the cylinder wheel results in reciprocatory movement of the pistons within the cylinders, self-closing yieldable valve means near the periphery of the cylinder wheel for directing liquid contained by the housing into each of the cylinders when the valve means are submerged in the liquid, an exhaust valve and an associated exhaust passage for each cylinder, said exhaust passages terminating in liquid exhaust ports in the valve hub of the cylinder wheel, a yielding valve element normally closing the said exhaust ports of the hub, means for regulating the force with which the yielding valve element impinges upon the hub to close the exhaust ports, and means operable exteriorly of the housing for manually disassociating said yielding valve element entirely from the ports, to induce free exhausting of liquid through said ports as the pistons reciprocate.

3. In a power transmission device, the combination of a housing for containing a predetermined level of liquid, a drive shaft rotatably supported at one end of the housing, a driven shaft rotatably supported at the opposite end of the housing, the two shafts being in axial alignment, a substantially hollow cylinder wheel mounted for rotation upon the drive shaft, a valve hub carried by the cylinder wheel and including a tapered portion, an eccentric element on the drive shaft and disposed within the cylinder wheel, a plurality of cylinders disposed radially of the cylinder wheel, a reciprocable piston in each cylinder, and a connecting rod for each piston to connect the pistons with the eccentric element of the drive shaft so that relative rotational movement between the eccentric element and the cylinder wheel results in reciprocatory movement of the pistons within the cylinders, self-closing yielding valve means near the periphery of the cylinder wheel for directing liquid contained by the housing into each of the cylinders when the valve means are submerged in the liquid, an exhaust valve and an associated exhaust passage for each cylinder, said exhaust passages terminating in liquid exhaust ports in the tapered portion of the hub of the cylinder wheel, a yielding valve element correspondingly tapered for normally closing the said exhaust ports in the tapered portion of the hub, and means for regulating the force with which the yielding valve element impinges upon the hub to close the exhaust ports.

4. In a power transmission device, the combination of a housing for containing a predetermined level of liquid, a drive shaft rotatably supported at one end of the housing, a driven shaft rotatably supported at the opposite end of the housing, the two shafts being in axial alignment, a substantially hollow cylinder wheel mounted for rotation upon the drive shaft, a valve hub carried by the cylinder wheel and including a tapered portion, an eccentric element on the drive shaft and disposed within the cylinder wheel, a plurality of cylinders disposed radially of the cylinder wheel, a reciprocable piston in each cylinder, and a connecting rod for each piston to connect the pistons with the eccentric element of the drive shaft so that relative rotational movement between the eccentric element and the cylinder wheel results in reciprocatory movement of the pistons within the cylinders, self-closing yielding valve means near the periphery of the cylinder wheel for directing liquid contained by the housing into each of the cylinders when the valve means are submerged in the liquid, an exhaust valve and an associated exhaust passage for each cylinder, said exhaust passages terminating in liquid exhaust ports in the tapered portion of the hub of the cylinder wheel, a yielding valve element correspondingly tapered for normally closing the said exhaust ports in the tapered portion of the hub, and means operable manually at a location remote from the housing interior for regulating the force with which the yielding valve element impinges upon the hub to close the exhaust ports.

5. In a power transmission device, the combination of a housing for containing a predetermined level of liquid, a drive shaft rotatably supported at one end of the housing, a driven shaft rotatably supported at the opposite end of the housing, the two shafts being in axial alignment, a substantially hollow cylinder wheel mounted for rotation upon but relative to the drive shaft, a valve hub carried by the cylinder wheel, an eccentric element on the drive shaft and disposed within the cylinder wheel, a plurality of cylinders disposed radially of the cylinder wheel, a reciprocable piston in each cylinder, and a connecting rod for each piston to connect the pistons with the eccentric element of the drive shaft so that relative rotational movement between the eccentric element and the cylinder wheel results in reciprocatory movement of the pistons within the cylinders, self-closing yieldingly seated valves and means near the periphery of the cylinder wheel for directing liquid contained by the housing into each of the cylinders when the valves and directing means are submerged and moving in the liquid, an exhaust valve and an associated exhaust passage for each cylinder, said exhaust passages terminating in liquid exhaust ports in the valve hub of the cylinder wheel, a reciprocable valve element normally yieldingly closing the said exhaust ports of the hub, and means for regulating the force with which the valve element impinges upon the hub to close the exhaust ports, thereby rendering the reciprocable valve element self-opening when the pistons operate to increase to a predetermined value the pressure of the liquid in the cylinders.

6. In a power transmission device, the combination of a housing for containing a predetermined level of liquid, a drive shaft rotatably supported at one end of the housing, a driven shaft rotatably supported at the opposite end of the housing, the two shafts being in axial alignment, a substantially hollow cylinder wheel mounted for rotation upon but relative to the drive shaft, a valve hub carried by the cylinder wheel, an eccentric element on the drive shaft and disposed within the cylinder wheel, a plurality of cylinders disposed radially of the cylinder wheel, a reciprocable piston in each cylinder, and a connecting rod for each piston to connect the pistons with the eccentric element of the drive shaft so that relative rotational movement between the eccentric element and the cylinder wheel results in reciprocatory movement of the pistons within the cylinders, self-closing yieldingly seated valves and means near the periphery of the cylinder wheel for directing liquid contained by the housing into each of the cylinders when the valves and directing means are submerged and moving in the liquid, an exhaust valve and an associated exhaust passage for each cylinder, said exhaust passages terminating in liquid exhaust ports in the valve hub of the cylinder wheel, a reciprocable valve element normally yieldingly closing the said exhaust ports of the hub, and means for regulating the force with which the valve element impinges upon the hub to close the exhaust ports, thereby rendering the reciprocable valve element self-opening when the pistons operate to increase to a predetermined value the pressure of the liquid in the cylinders, and means operable exteriorly of the housing for manually disassociating said reciprocable valve element entirely from the ports to induce free and unrestricted exhausting of liquid through said ports as the pistons reciprocate.

HUBERT D. RODGERS.